(12) United States Patent
Yoon et al.

(10) Patent No.: US 11,166,617 B2
(45) Date of Patent: Nov. 9, 2021

(54) DISHWASHER WITH HEAT PUMP

(71) Applicant: LG Electronics Inc., Seoul (KR)

(72) Inventors: Sangheon Yoon, Seoul (KR);
Changyoon Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/698,207

(22) Filed: Nov. 27, 2019

(65) Prior Publication Data
US 2020/0163527 A1 May 28, 2020

(30) Foreign Application Priority Data

Nov. 28, 2018 (KR) .......................... 10-2018-0150014

(51) Int. Cl.
*A47L 15/42* (2006.01)

(52) U.S. Cl.
CPC ....... *A47L 15/4285* (2013.01); *A47L 15/4219* (2013.01); *A47L 15/4278* (2013.01); *A47L 15/4287* (2013.01)

(58) Field of Classification Search
CPC ............. A47L 15/4285; A47L 15/4278; A47L 15/4287; A47L 15/4219
See application file for complete search history.

(56) References Cited

U.S. PATENT DOCUMENTS 7,093,604 B2 * 8/2006 Jung ................... A47L 15/4285
134/25.2

FOREIGN PATENT DOCUMENTS

| CN | 1186206 A | * | 7/1998 | ............... F24H 4/04 |
| CN | 106580218 A | * | 4/2017 | |
| CN | 106725181 A | * | 5/2017 | |
| EP | 2682036 A2 | * | 1/2014 | ......... A47L 15/4219 |
| EP | 2978360 B1 | * | 8/2017 | ......... A47L 15/4291 |
| JP | H11179465 A | * | 7/1999 | |
| KR | 100770071 | | 10/2007 | |
| KR | 101037921 | | 5/2011 | |
| KR | 101037921 B1 | * | 5/2011 | ........... A47L 15/241 |
| KR | 20160049994 A | * | 5/2016 | ............. F28D 20/00 |
| KR | 20170010564 A | * | 2/2017 | ......... A47L 15/4225 |

* cited by examiner

*Primary Examiner* — Michael E Barr
*Assistant Examiner* — Pallavi Chitta
(74) *Attorney, Agent, or Firm* — Fish & Richardson P.C.

(57) ABSTRACT

The present disclosure relates to a dishwasher having a heat pump, including a dishwasher body provided with a tub configured with a washing space therein and a sump provided at a bottom of the tub to temporarily accommodate washing water; a spray arm provided inside the washing space to spray washing water; a circulation pump that pumps the washing water of the sump; a washing water guide that guides the washing water pumped by the circulation pump to the spray arm; a heat pump provided with a compressor, an evaporator, an expansion apparatus, and a condenser provided to exchange heat in contact with the washing water of the washing water guide; and a controller that controls the heat pump to increase the temperature of the washing water of the washing water guide. As a result, it may be possible to suppress heat loss from being generated while heating washing water.

20 Claims, 15 Drawing Sheets

DISHWASHER WITH HEAT PUMP

CROSS-REFERENCE TO RELATED APPLICATIONS

Pursuant to 35 U.S.C. § 119(a), this application claims the benefit of earlier filing date and right of priority to Korean Application No. 10-2018-0150014, filed on Nov. 28, 2018, the contents of which is incorporated by reference herein in its entirety.

TECHNICAL FIELD

The present disclosure relates to a dishwasher having a heat pump.

BACKGROUND

As is known, dishwasher is a type of appliance that cleans dishes and/or cooking utensils using detergent and washing water. Such a dishwasher includes a dishwasher body typically configured with a washing space therein and a door that opens and closes the washing space.

The dishwasher body includes a rack for accommodating and supporting dishes, a spray arm for spraying washing water to the rack, a supply pump for supplying washing water to the spray arm, and a drain pump for draining the washing water of the sump to an outside of the dishwasher body.

The dishwasher includes various washing courses including some or all of pre-washing, washing, rinsing, heating rinsing and drying processes.

On the other hand, the dishwasher body is provided with a heating unit for heating the washing water. The heating unit, for example, is composed of an electric heater for generating heat when power is applied to heat washing water.

However, in a dishwasher in the related art, washing water is heated using an electric heater, and thus there is a problem that a relatively large amount of power is consumed when washing water is heated. Furthermore, washing water heated to wash dishes is discharged to an outside of the dishwasher in a state having a high temperature (energy), and thus there is a problem that energy loss occurs.

In consideration of this problem, some of the dishwashers are designed to have a waste heat recovery device for recovering the waste heat of the dishwasher using a heat pump to heat water supply, and some of the other dishwashers are designed to arrange a condenser on a moving path through which washing water is moved to a spray arm to heat washing water inside the cleaning tank.

However, in a waste heat recovery device of a dishwasher using such a heat pump, in order to recover heat from washing water discharged from a dishwasher, a plurality of heat exchange apparatuses and a long passage for the movement of washing water are configured separately from the dishwasher, and thus there is a problem that the number of parts for heating of washing water and waste heat recovery and the size thereof are increased and the configuration and control thereof are complicated.

In addition, washing water to be supplied is heated using the heat of the washing water discharged after a washing process or after a rinsing process, and thus there is a problem that the washing water to be supplied cannot be preheated before the washing process. Due to this, there is a problem that it takes a relatively long time to heat washing water.

Moreover, in a dishwasher in which a condenser is disposed on a moving path through which washing water is moved to a spray arm to heat washing water inside the moving path, a refrigerant pipe of the condenser is wound around an outer surface of the washing water pipe forming the moving path to exchange heat, and thus there is a problem that heat exchange between the refrigerant and the washing water is insufficient. Besides, the heat dissipation energy of the condenser is released into the air without being used to heat washing water, and thus there is a problem that the operating efficiency of the heat pump is deteriorated.

Furthermore, heat exchange between the refrigerant of the condenser and the washing water of the washing water pipe is insufficient, and thus a lot of time is required to heat the washing water, and as a result, there is a problem that an overall dish washing time is prolonged.

PRIOR ART DOCUMENTS

Patent Documents (Patent Document 1) KR10-1037921 B1
(Patent Document 2) KR10-0770071 B1

SUMMARY

An aspect of the present disclosure is to provide a dishwasher having a heat pump capable of shorten the heating time of washing water to suppress washing time from being prolonged.

Furthermore, another aspect of the present disclosure is to provide a dishwasher having a heat pump capable of suppressing heat loss from being generated during the heating of washing water.

In addition, still another aspect of the present disclosure is to provide a dishwasher having a heat pump capable of eliminating the use of an additional heat exchange apparatus for heating washing water.

Moreover, yet still another aspect of the present disclosure is to provide a dishwasher having a heat pump capable of improving the operating efficiency of the heat pump.

In order to achieve the foregoing objectives, the present disclosure provides a dishwasher having a heat pump, including a dishwasher body provided with a tub configured with a washing space therein and a sump provided at a bottom of the tub to temporarily accommodate washing water; a spray arm provided inside the washing space to spray washing water; a circulation pump that pumps the washing water of the sump; a washing water guide that guides the washing water pumped by the circulation pump to the spray arm; a heat pump provided with a compressor, an evaporator, an expansion apparatus, and a condenser provided to exchange heat in contact with the washing water of the washing water guide; and a controller that controls the heat pump to increase the temperature of the washing water of the washing water guide.

According to an embodiment, the spray arm may be provided with an upper spray arm and a lower spray spaced apart in a vertical direction inside the washing space, and the washing water guide may be provided with an upper guide connected to the upper spray arm and a lower guide connected to the lower spray arm, and the condenser may be provided inside the upper guide.

According to an embodiment, the spray arm may include a top spray arm provided at an upper portion of the washing space, and the washing water guide may include a top guide connected to the top spray arm, and the upper guide and the top guide may have a common passage, and the condenser may be provided inside the common passage.

According to an embodiment, a passage switching valve that switches a passage of washing water may be provided between the washing water guide and the circulation pump, and the controller may control the passage switching valve to allow washing water flow into the upper guide, and then control the circulation pump to be driven, and control the heat pump to increase the temperature of the washing water of the upper guide.

According to an embodiment, the dishwasher may further include a mode selection unit that selects an operation mode of the dishwasher body, wherein the controller controls the passage switching valve and the heat pump based on the operation mode selected by the mode selection unit.

According to an embodiment, the operation mode may include an energy saving washing mode, and the controller may control the passage switching valve to allow washing water to flow to the upper guide, and control the heat pump to drive the heat pump when the energy saving washing mode is selected by the mode selection unit.

According to an embodiment, the dishwasher may further include an electric heater that heats the washing water of the sump when power is applied, wherein the operation mode includes a rapid washing mode, and the controller controls the passage switching valve to allow washing water to flow to the upper guide, and controls the heat pump and the electric heater, respectively, to operate the heat pump and the electric heater, respectively, when the rapid washing mode is selected by the mode selection unit.

According to an embodiment, the dishwasher may further include an electric heater that heats the washing water of the sump and a temperature sensing unit that senses a temperature of the washing water of the sump when power is applied, wherein the operation mode includes a general washing mode, and the controller controls the passage switching valve to allow washing water to flow to the upper guide, and then controls the heat pump to drive the heat pump when the general washing mode is selected by the mode selection unit, and senses the temperature of the washing water by the temperature sensing unit after a predetermined time has elapsed, and controls power to be applied to the electric heater when the temperature of the washing water is less than a predetermined temperature.

According to an embodiment, an inside of the washing water guide may be provided with a condenser support portion that supports the condenser.

According to an embodiment, the condenser support portion may support the condenser to be spaced apart from a predetermined distance from an inner wall surface of the washing water guide.

According to an embodiment, the condenser support portion may be provided with a plurality of support pieces configured with a contact support surface recessed to correspond to an outer surface of the refrigerant pipe of the condenser, and spaced apart from one another.

According to an embodiment, the condenser may be provided with an inlet side refrigerant pipe and an outlet side refrigerant pipe arranged in parallel with each other inside the washing water guide, and the plurality of support pieces may be spaced apart in a length direction of the inlet side refrigerant pipe and the outlet side refrigerant pipe, respectively.

According to an embodiment, the condenser may be provided with an inlet side refrigerant pipe and an outlet side refrigerant pipe arranged in parallel with each other inside the washing water guide, and a connection pipe connecting the inlet side refrigerant pipe and the outlet side refrigerant pipe, and the plurality of support pieces may be spaced apart in a length direction of the inlet side refrigerant pipe, the outlet side refrigerant pipe and the connection pipe, respectively.

According to an embodiment, the washing water guide may be provided with a first guide portion and a second guide portion that are hermetically coupled in contact with each other, with the condenser interposed therebetween.

According to an embodiment, the compressor and the evaporator may be provided to exchange heat with each other.

Here, the evaporator may be bent to surround a lateral surface of the compressor in at least two directions.

The evaporator is configured to have an "L" shape.

According to an embodiment, the evaporator may be provided to exchange heat with water in a water tank inside the water tank.

According to an embodiment, the water tank may be provided with a water pipe that supplies water into the water tank and a water level sensing unit that senses a water level inside the water tank, and the water pipe may be provided with a water pipe open-close valve that opens and closes the passage therein.

Here, the water pipe open-close valve may be opened and closed based on a sensing result of the water level sensing unit.

According to an embodiment, the water tank may be provided at an upper side of the compressor.

As a result, heat energy generated from the compressor is easily transferred to the water tank provided at an upper side of the compressor.

According to an embodiment, a heat transfer member that transfers the heat energy of the compressor to the water tank may be provided between the water tank and the compressor.

According to an embodiment, the heat transfer member may be provided with a heat exchange unit that exchanges heat with the compressor.

Here, the heat exchange unit is configured to be wound several times on outer surface of the compressor.

As a result, heat energy generated from the compressor is easily transferred to the heat exchange unit.

According to an embodiment, both end portions of the heat transfer member may be communicated with the water tank and coupled to have a height difference from each other.

As a result, water inside the water tank may easily flow into and out of the heat exchange unit.

As described above, according to an embodiment of the present disclosure, it is configured such that a condenser is provided inside a moving path of washing water and the washing water and the condenser are heat-exchanged in direct contact with each other to reduce the heating time of the washing water, thereby suppressing the washing time from being prolonged.

Furthermore, washing water and the condenser may be heat-exchanged in direct contact with each other, thereby suppressing heat loss from being generated during the heating of the washing water.

In addition, the condenser may be disposed inside a washing water guide, thereby eliminating the use of an additional heat exchange apparatus for heating washing water. Moreover, a space for installing the condenser may be saved, thereby allowing a compact configuration.

Besides, the evaporator and the compressor may be configured to exchange heat with each other to facilitate the latent heat absorption of the evaporator, thereby facilitating the evaporation of refrigerant inside the evaporator.

Furthermore, the evaporator and the compressor may be configured to exchange heat with each other, thereby facilitating the latent heat absorption of the evaporator as well as promoting the cooling of the compressor to reduce a load on the compressor. As a result, the operating efficiency of the heat pump may be improved.

In addition, a condenser support portion for supporting the condenser to be spaced apart at a predetermined distance may be provided inside the washing water guide, thereby increasing the heat exchange of the washing water of the condenser to shorten the heating time of the washing water. Moreover, the operating efficiency of the heat pump may be improved.

BRIEF DESCRIPTION OF THE DRAWING

The accompanying drawings, which are included to provide a further understanding of the disclosure and are incorporated in and constitute a part of this specification, illustrate one or more implementations of the disclosure and together with the description serve to explain the principles of the disclosure.

DETAILED DESCRIPTION

Figure 1:
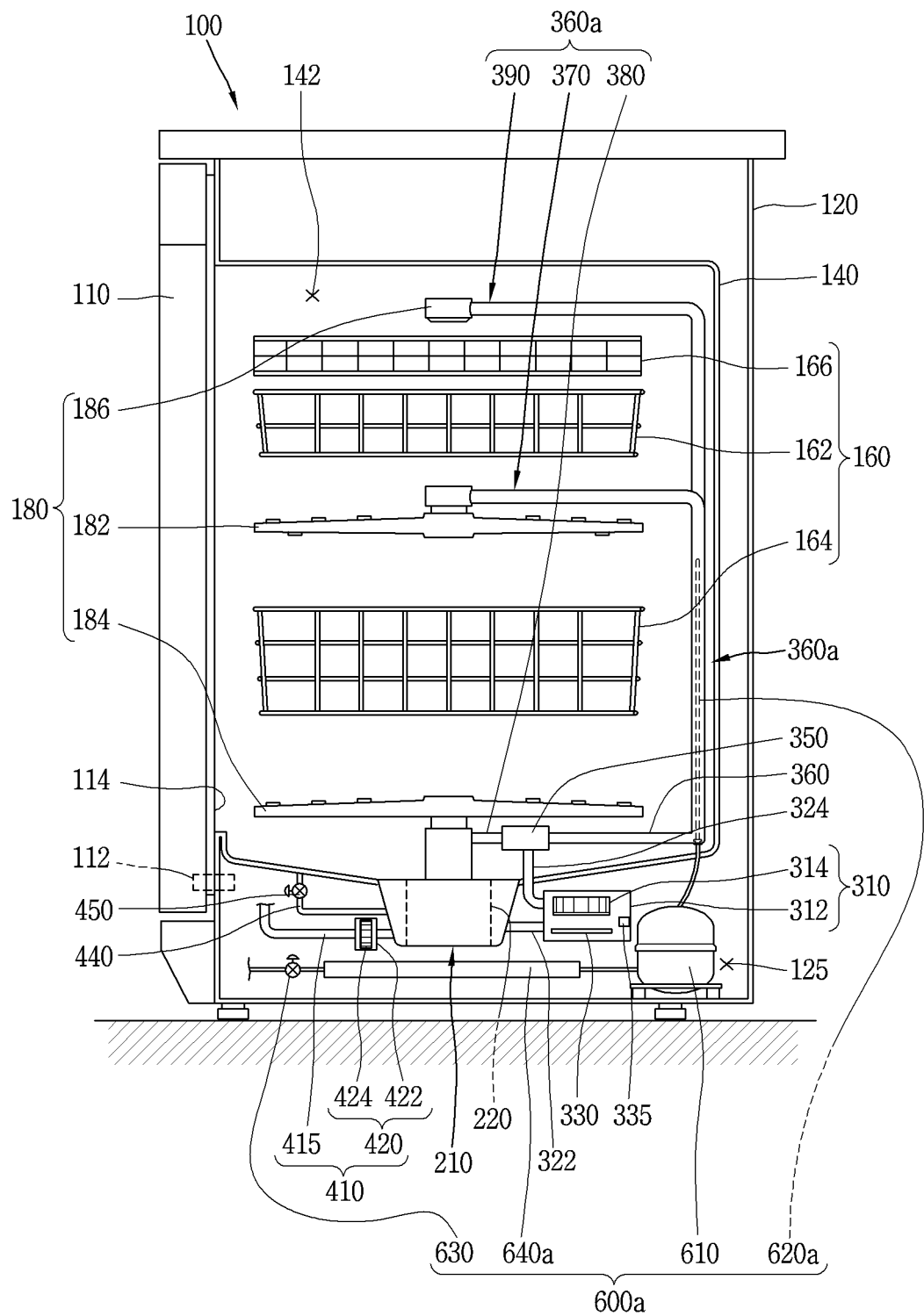
FIG. 1 is a cross-sectional view of a dishwasher having a heat pump according to an embodiment of the present disclosure.

Hereinafter, preferred embodiments disclosed in the present disclosure will be described in detail with reference to the accompanying drawings. Even in different embodiments according to the present disclosure, the same or similar reference numerals are designated to the same or similar configurations, and the description thereof will be substituted by the earlier description. A singular representation used in the present disclosure may include a plural representation as far as it represents a definitely different meaning from the context. In describing the embodiments disclosed herein, moreover, the detailed description will be omitted when specific description for publicly known technologies to which the invention pertains is judged to obscure the gist of the present invention. Also, it should be noted that the accompanying drawings are merely illustrated to easily explain the concept of the invention, and therefore, they should not be construed to limit the technological concept disclosed herein by the accompanying drawings.

Figure 2:
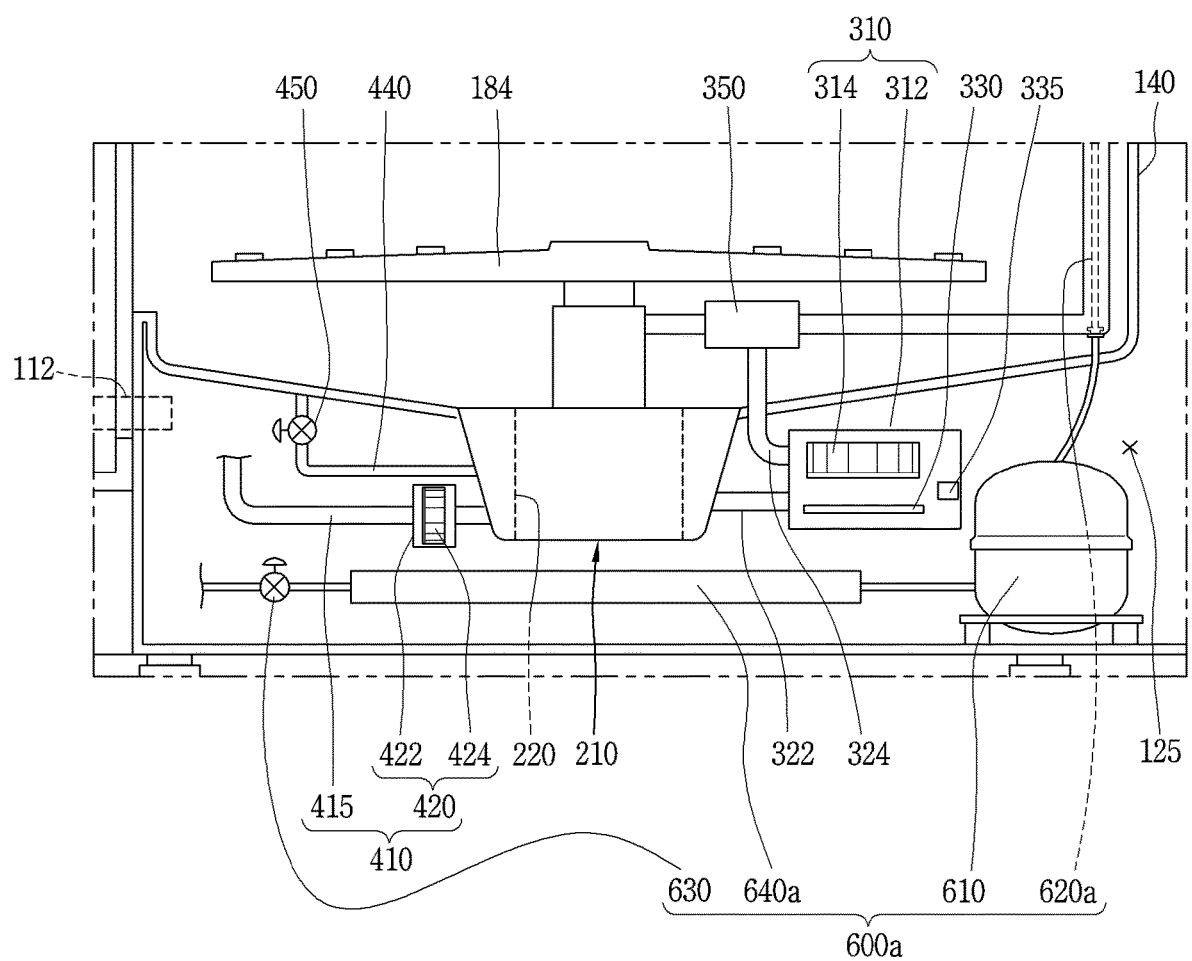
FIG. 2 is a partially enlarged view of FIG. 1.
Figure 3:
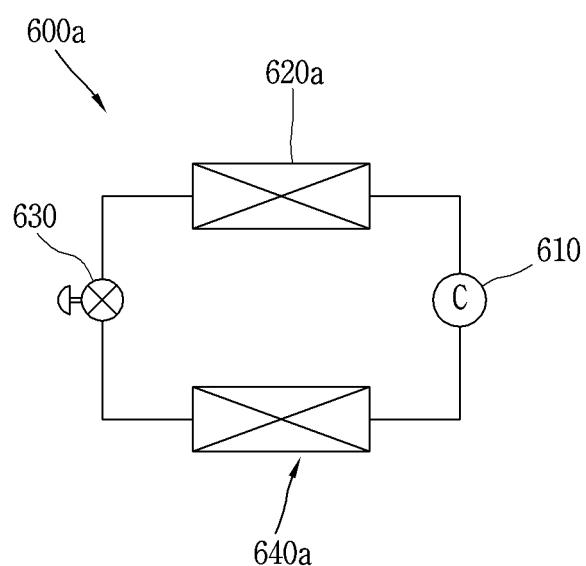
FIG. 3 is a configuration diagram of the heat pump in FIG. 1.

FIG. 1 is a cross-sectional view of a dishwasher having a heat pump according to an embodiment of the present disclosure, and FIG. 2 is a partially enlarged view of FIG. 1, and FIG. 3 is a configuration diagram of the heat pump in FIG. 1. As illustrated in FIGS. 1 and 2, a dishwasher according to an embodiment of the present disclosure includes a dishwasher body 100 configured with a washing space 142 therein and a door 110 that opens and closes the washing space 142.

The dishwasher body 100 includes a cabinet 120 forming an appearance. The cabinet 120 has a substantially rectangular parallelepiped shape. A tub 140 forming a washing space 142 therein is located inside the cabinet 120. The tub 140 is configured to be open in a forward direction. The tub 140 is disposed to be spaced apart from the bottom surface of the cabinet 120. As a result, a machine room 125 is disposed below the tub 140 inside the cabinet 120.

A front surface of the dishwasher body 100 is provided with a door 110 that opens and closes a front opening of the tub 140. A hinge 112 is provided below the door 110. The door 110 opens and closes the front opening of the tub 140 while rotating along a vertical direction of the dishwasher body 100 around the hinge 112. A gasket 114 is provided in a mutual contact region between the door 110 and the dishwasher body 100. As a result, when the door 110 is closed, the front opening of the tub 140 is hermetically blocked to suppress the leakage of washing water therein.

A sump 210 is provided at the bottom of the tub 140. The sump 210 is configured to be open in an upward direction. The bottom of the tub 140 is configured to be inclined. The sump 210 is disposed such that the upper opening corresponds to a lower region of the bottom surface of the tub 140. As a result, washing water inside the tub 140 is temporarily accommodated in the sump 210. An upper end of the sump 210 is coupled to correspond to a bottom surface of the tub 140 and extended to a lower side of the tub 140 and disposed inside the machine room 125.

The rack 160 for accommodating dishes is provided inside the tub 140. A plurality of the racks 160 are provided therein, and spaced apart along an inner vertical direction of the tub 140. The rack 160 includes an upper rack 162 provided in an inner upper region of the tub 140. The rack has a lower rack 164 provided at an inner lower portion of the tub 140. The rack has a top rack 166 provided in an inner upper region of the tub 140. The top rack 166 may be provided above the upper rack 162.

An spray arm for spraying washing water is provided inside the tub 140. A plurality of the racks 160 are provided therein, and spaced apart along an inner vertical direction of the tub 140. The spray arm has an upper spray arm 182 for spraying toward the upper rack 162. The upper spray arm 182 may be provided at, for example, a lower side of the upper rack 162. The spray arm has a lower spray arm 184 for spraying toward the lower rack 164. The lower spray arm 184 may be disposed at, for example, a lower side of the lower rack 164. The spray arm has a top spray arm 186 for spraying washing water toward the top rack 166. The top spray arm 186 may be provided at, for example, an upper side of the top rack 166.

A filter 220 for collecting contaminants contained in washing water is installed inside the sump 210. One side of the sump 210 is provided with a connection pipe 440 through which washing water flows into the sump 210. The connection pipe 440 is provided with an open-close valve 450 that opens and closes the connection pipe 440.

Another side of the sump 210 is provided with a circulation pump 310 for pumping and circulating washing water. The circulation pump 310 includes a housing 312 and an impeller 314 rotatably installed inside the housing 312. An inlet side of the housing 312 is provided with a suction pipe 322 communicating with the sump 210. As a result, washing water inside the sump 210 may be introduced into the housing 312. An outlet side of the housing 312 is connected to a discharge pipe 324 connected to a passage switching valve 350 which will be described later. A heating unit 330 may be provided inside the circulation pump 310, for example. As a result, the washing water may be heated by the heat generation of the electric heater 330 when power is applied. A temperature sensing unit 335 for sensing the temperature of the washing water is installed inside the circulation pump 310. As a result, the temperature of the washing water may be detected. In the present embodiment, it is illustrated a case where the electric heater 330 is provided to heat washing water inside the circulation pump 310, but it is merely an example, and the electric heater 330 may be installed in the sump 210, or may be removed (deleted) from the circulation pump 310 and the sump 210. Still another side of the sump 210 is provided with a drain unit 410 for draining the washing water of the sump 210 to the outside. The drain unit 410 includes, for example, a drain passage 415 connected to communicate with the sump 210 to form a passage of washing water, and a drain pump 420 provided in the drain passage 415. The drain pump 420 has, for example, a housing 422 and an impeller 424 rotatably installed inside the housing 422.

A passage switching valve 350 for switching a passage of washing water is connected to an outlet side of the circulation pump 310. A washing water guide 360a for guiding washing water discharged from the circulation pump 310 to the spray arm is connected to the passage switching valve 350. The washing water guide 360a includes an upper guide 370 connected to the upper spray arm 182 and a lower guide 380 connected to the lower spray arm 184. The washing water guide 360a includes a top guide 390 connected to the top spraying arm 186.

On the other hand, the dishwasher of the present embodiment is provided with a heat pump 600a to heat washing water inside the washing water guide 360a. As illustrated in FIG. 3, the heat pump 600a includes a compressor 610 for compressing refrigerant, a condenser 620a for condensing refrigerant by heat radiation, an expansion apparatus 630 for depressurizing and expanding refrigerant, and an evaporator 640a for allowing refrigerant to absorb surrounding latent heat to evaporate. The compressor 610, the condenser 620a, the expansion apparatus 630, and the evaporator 640a are connected to a refrigerant pipe to allow the refrigerant to circulate.

The compressor 610 is installed inside a lower space (machine room 125) of the tub 140 inside the cabinet 120. One side of the compressor 610 is provided with the evaporator 640a. The condenser 620a is provided inside the washing water guide 360a. As a result, washing water inside the washing water guide 360a and the condenser 620a may directly contact with each other to suppress heat loss from being generated when the washing water is heated. In addition, the condenser 620a and washing water may be directly exchange heat with each other, thereby reducing the heating time of the washing water. The expansion apparatus 630 is provided between the condenser 620a and the evaporator 640a. The expansion apparatus 630 may be implemented by, for example, an electronic expansion valve. In the present embodiment, the expansion apparatus 630 is implemented as an electronic expansion valve, but it is merely an example, and the expansion apparatus 630 may be implemented as a capillary tube. The compressor 610, the evaporator 640a, and the expansion apparatus 630 may be disposed inside the machine room 125. Since the compressor 610 and the evaporator 640a may be provided inside the machine room 125, the evaporator 640a may easily absorb heat energy released from the compressor 610, thereby promoting evaporation. In addition, the compressor 610 may promote cooling due to the latent heat absorption of the evaporator 640a, thereby reducing the load. As a result, the operating efficiency of the heat pump 600a may be improved.

Figure 4:
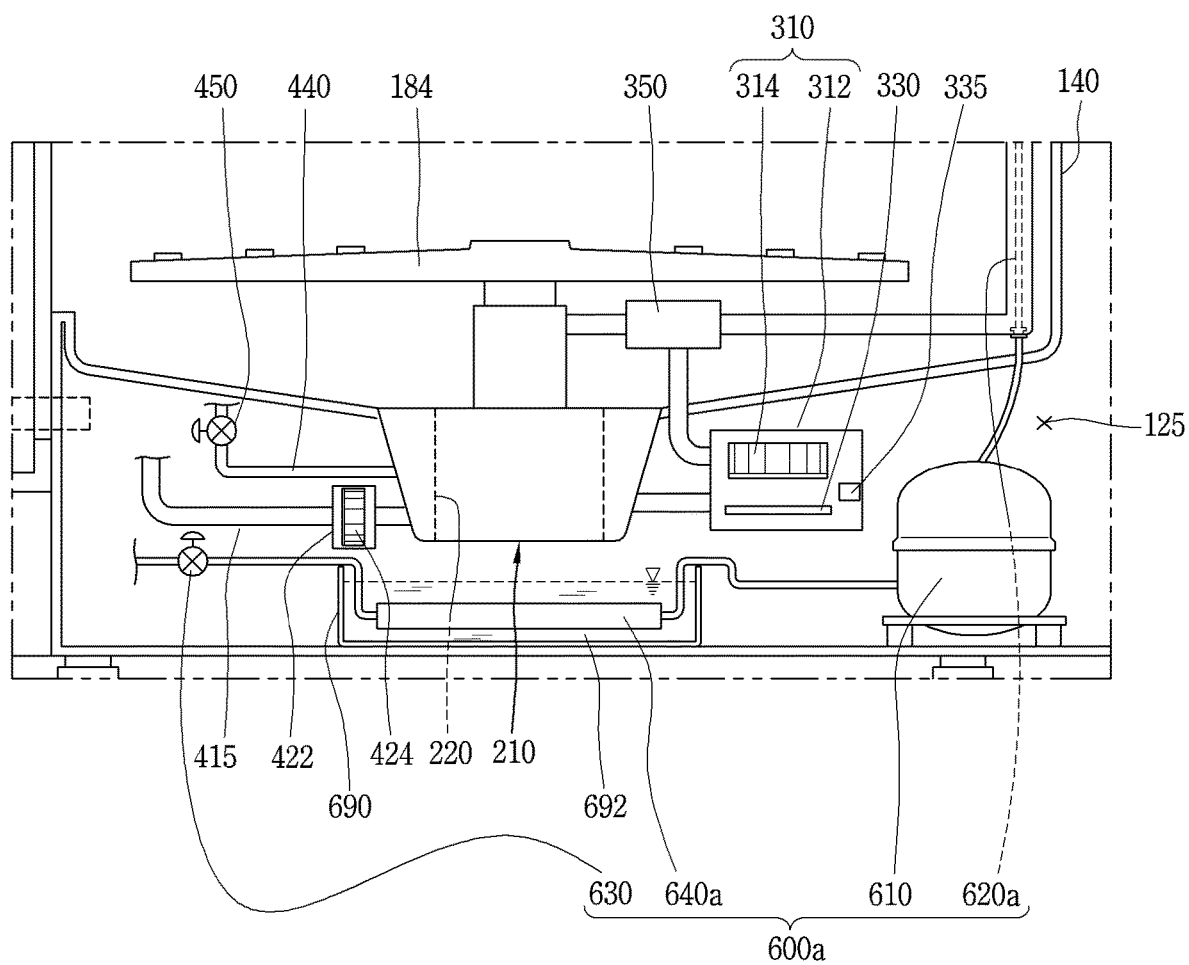
FIGS. 4 through 6 are modified examples of an evaporator in FIG. 2.
Figure 5:
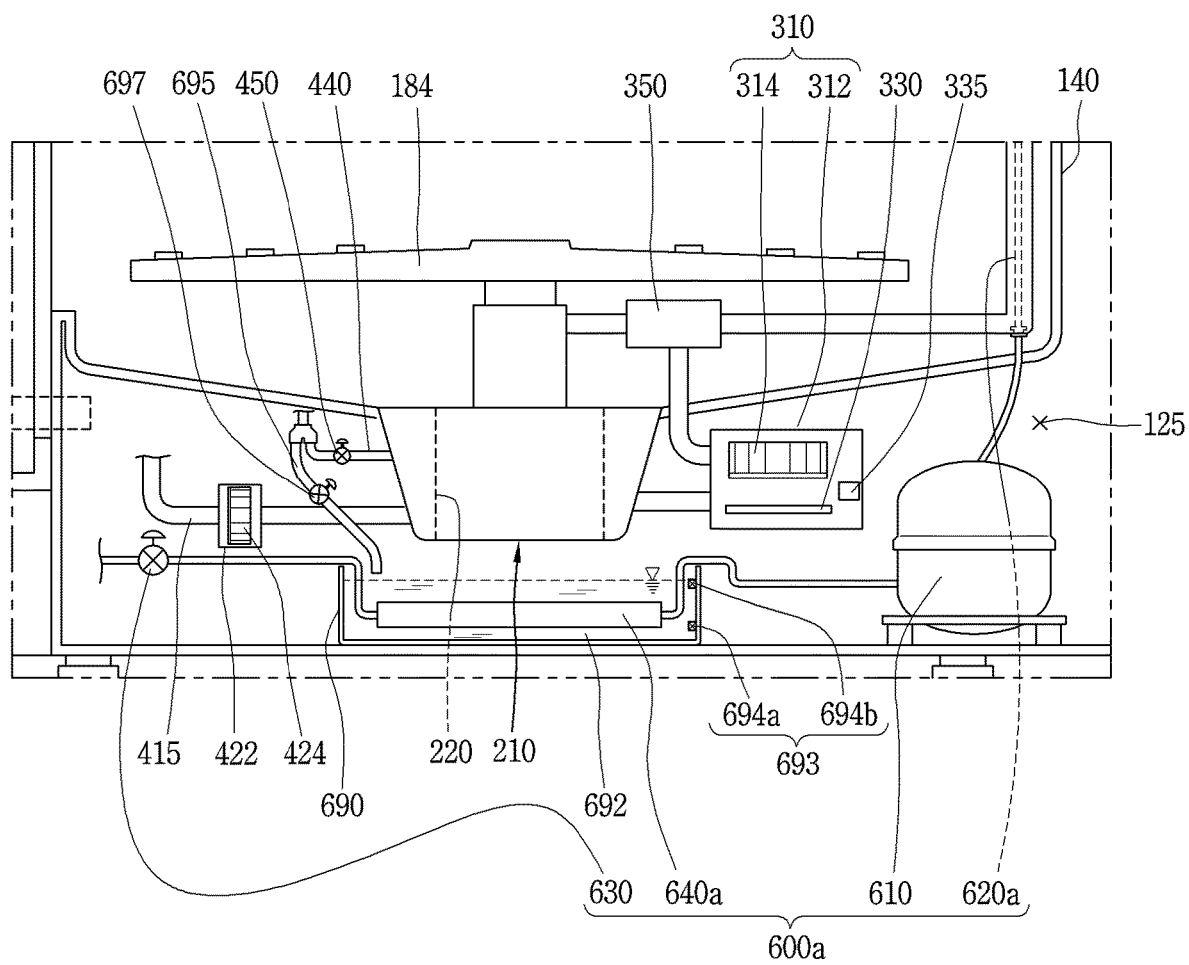
Figure 6:
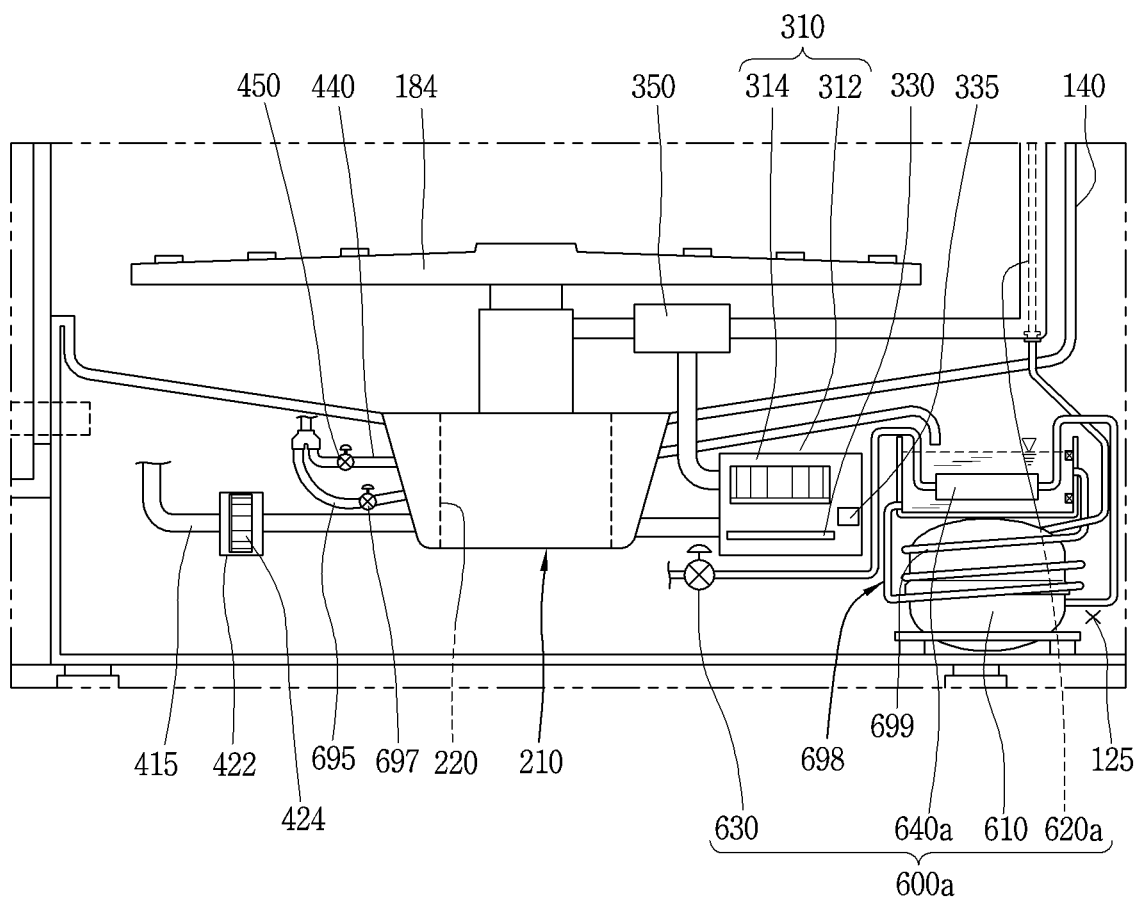

On the other hand, FIGS. 4 through 6 are modified examples of an evaporator in FIG. 2. As illustrated in FIG. 4, the evaporator 640a may be configured to exchange heat with water. A water tank 690 may be provided inside the machine room 125. The water tank 690 may be provided, for example, under the sump 210.

The water tank 690 may be implemented, for example, in an upwardly open cylindrical shape. Water 692 is provided inside the water tank 690. The evaporator 640a is accommodated in the water tank 690 so as to exchange heat with the water 692. According to such a configuration, the latent heat absorption of the evaporator 640a may be facilitated during the operation of the heat pump 600a.

As illustrated in FIG. 5, the water tank 690 may be provided with a water level sensing unit 693 for sensing a level of the water 692. The water level sensing unit 693 may include, for example, a lower sensing unit 694a and an upper sensing unit 694b spaced apart from each other in a vertical direction of the water tank 690. The water tank 690 may be provided with a water supply pipe 695 for supplying water into the water tank 690. The water supply pipe 695 may be branched from, for example, the connection pipe 440. The water pipe 695 may be provided with a water pipe valve 697 that opens and closes an internal passage. According to such a configuration, water supply inside the water tank 690 may be controlled based on the water level sensing result of the water level sensing unit 693. More specifically, when the low water level is detected by the lower sensing unit 694a, the water pipe valve 697 may be opened to supply water to the inside of the water tank 690. When a high water level is sensed by the upper sensing unit 694b, the water supply pipe valve 697 may be blocked to stop water supply to the water tank 690.

As illustrated in FIG. 6, the water tank 690 may be configured to exchange heat with the compressor 610. The water tank 690 may be disposed, for example, above the compressor 610. As a result, the temperature of the water tank 690 (water) may be increased by heat energy released from the compressor 610. The water tank 690 may be provided with a heat transfer member 698 for transferring the heat energy of the compressor 610. The heat transfer member 698 may be configured to exchange heat with the compressor 610 on one side thereof and heat exchange with the water tank 690 on the other side thereof.

The heat transfer member 698 may be implemented as, for example, a heat transfer pipe through which water is circulated. The heat transfer member 698 may be made of a metal member (for example, copper (CU) or aluminum (Al)). One end of the heat transfer member 698 is connected to communicate with one side of the water tank 690 and the other end thereof is disposed to be heat-exchanged to an outer surface of the compressor 610, and then connected to communicate with the other side of the water tank 690. The heat transfer member 698 may include a heat exchange unit 699 configured to exchange heat on a circumferential surface of the compressor 610. Here, both ends of the heat transfer member 698 may be connected to communicate with a height difference along a vertical direction of the water tank 690. In this configuration, when the compressor 610 is driven, the water 692 inside the heat exchange part 699 is heat-exchanged with the compressor 610 to raise the temperature and move upward by the convection phenomenon. By flowing into the interior of the 690, the water 692 inside the water tank 690 may be circulated and heated.

On the other hand, the heat transfer member 698, although not specifically shown in the drawing, for example, may have a rod shape of a metal member, and one end thereof may be brought into contact with the compressor 610 to exchange heat and the other end thereof may be configured to exchange heat with the water tank 690 (water). Accordingly, heat energy on a surface of the compressor 610 having a relatively high temperature may be transmitted to the water tank 690 through the heat transfer member 698 during the operation of the compressor 610.

Figure 7:
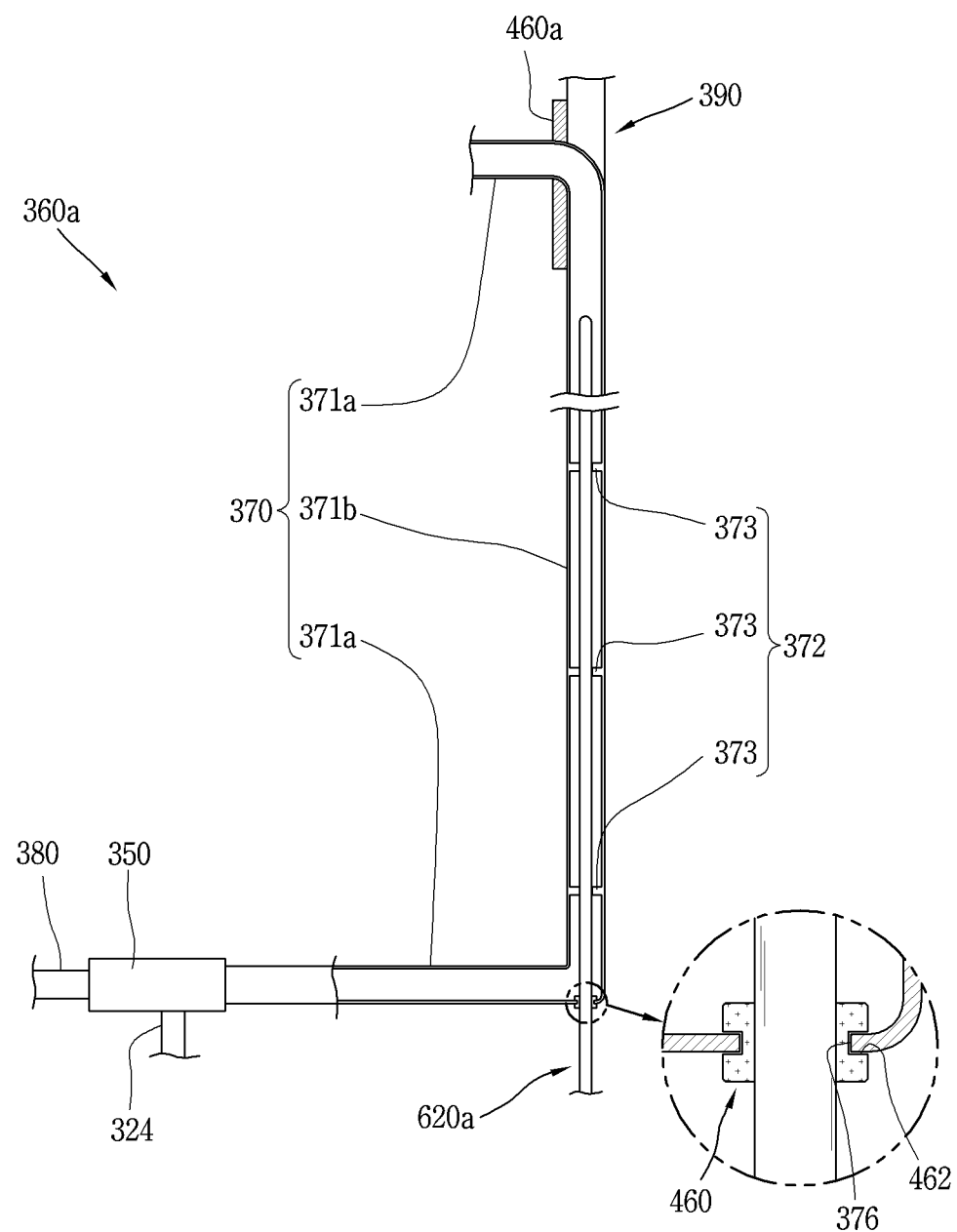
FIG. 7 is an enlarged view of a washing water guide in FIG. 1.
Figure 8:
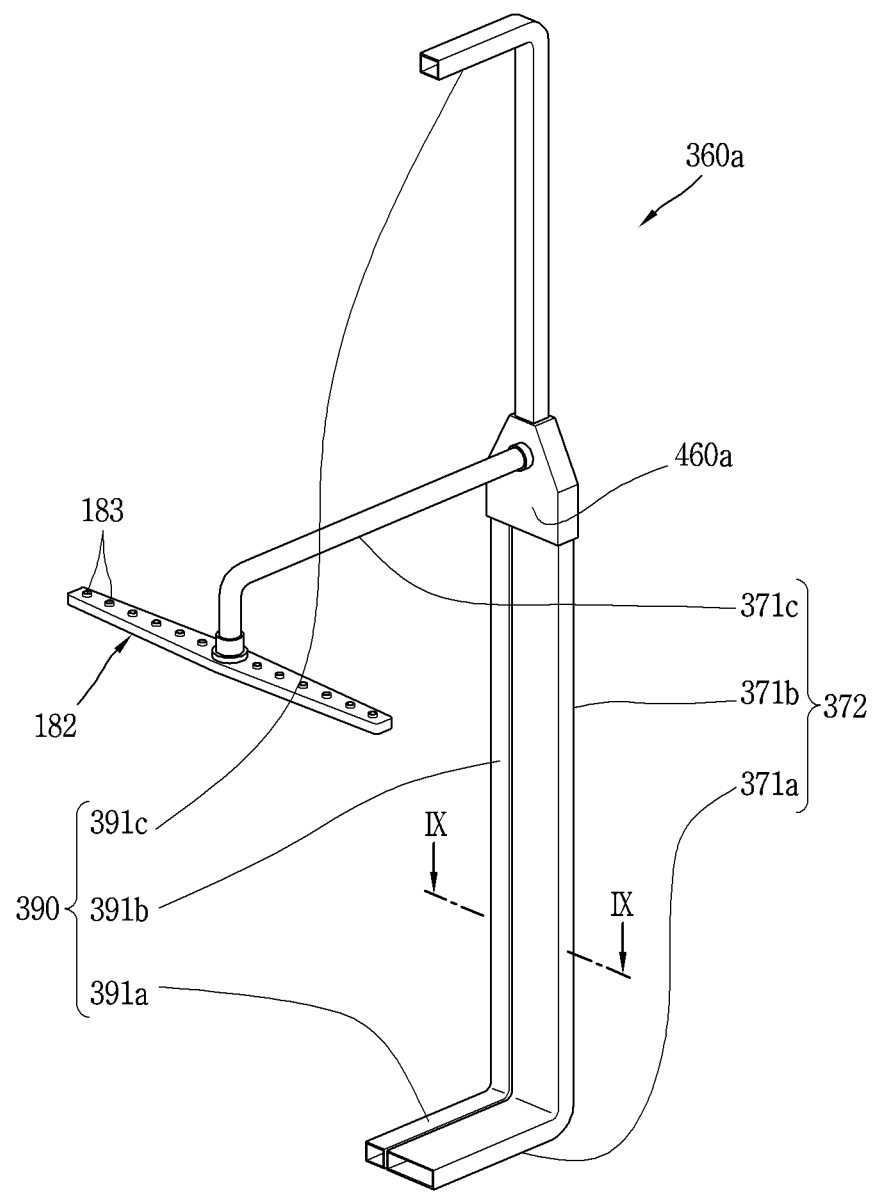
FIG. 8 is a perspective view of the washing water guide in FIG. 7.
Figure 9:
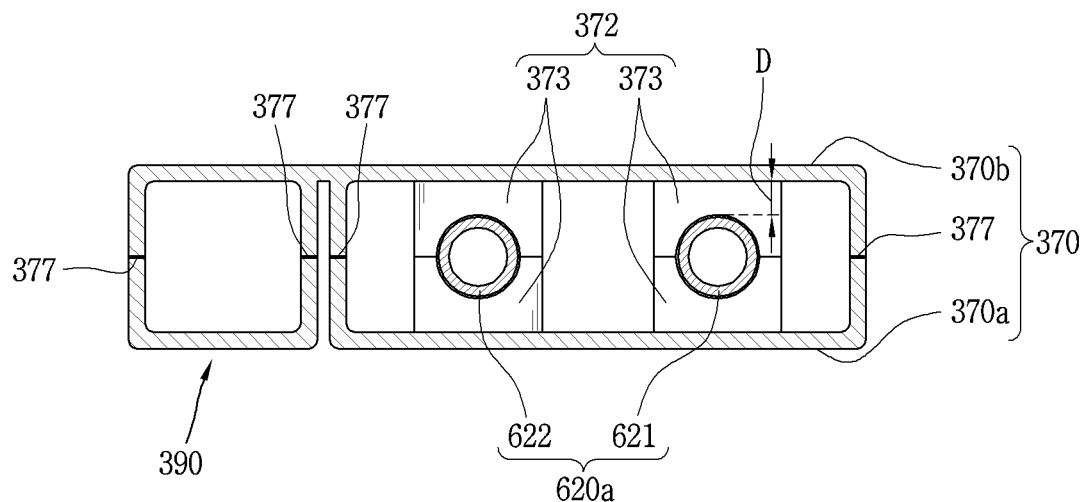
FIG. 9 is a cross-sectional view taken along line IX-IX in FIG. 8.
Figure 10:
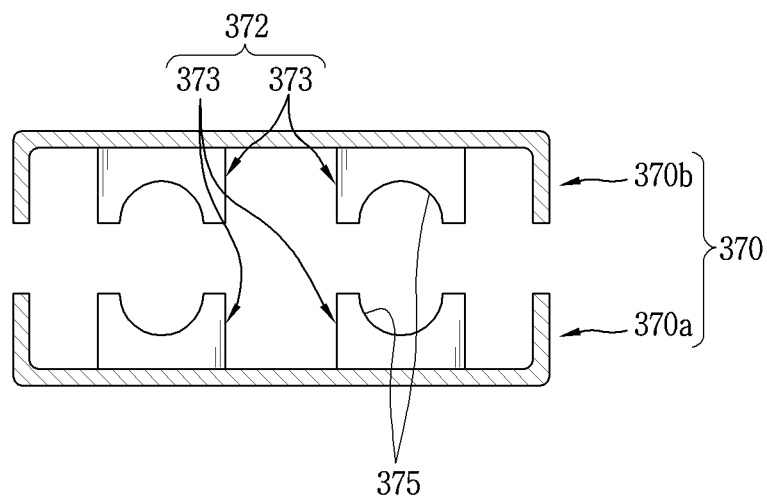
FIG. 10 is a view illustrating a state prior to coupling of the washing water guide in FIG. 9.

FIG. 7 is an enlarged view of a washing water guide in FIG. 1, and FIG. 8 is a perspective view of the washing water guide in FIG. 7, and FIG. 9 is a cross-sectional view taken along line IX-IX in FIG. 8, and FIG. 10 is a view illustrating a state prior to coupling of the washing water guide in FIG. 9. As illustrated in FIGS. 7 and 8, a washing water passage for flowing washing water is located inside the washing water guide 360*a*. The washing water guide 360*a* includes an upper guide 370 connected to the upper spray arm 182 and a top guide 390 connected to the top spray arm 186. The upper guide 370 includes a horizontal section 371*a* disposed in a horizontal direction in a bottom region of the tub 140, a vertical section 371*b* bent from the horizontal section 371*a* and extended upward, and a connection section 371*c* horizontally bent and extended from the vertical section 371*b* and connected to the upper spray arm 182.

The top guide 390 includes a horizontal section 391*a* disposed in a horizontal direction at the bottom of the tub 140, a vertical section 391*b* extended upward from the horizontal section 391*a*, and a connection section 391*c* horizontally bent and extended from the vertical section 391*b* and connected to the top spray arm 186.

A holder 460*a* for supporting the upper guide 370 and the top guide 390 is provided inside the tub 140. The holder 460*a* is coupled to the vertical sections 371*b*, 391*b* of the upper guide 370 and the top guide 390 to fix and support the upper guide 370 and the top guide 390. The connection section 371*c* of the upper guide 370 is coupled to the holder 460*a* in a protruding manner. The upper spray arm 182 is implemented in a rod shape. A plurality of nozzle holes 183 are disposed on an upper surface of the upper spray arm 182 to spray washing water. The upper spray arm 182 is rotatably coupled to the connection section 371*c*.

As illustrated in FIG. 7, the condenser 620*a* is provided inside the upper guide 370. A through portion 376 is disposed in the upper guide 370 to allow the condenser 620*a* to pass therethrough. The through portion 376 may be provided with a sealing member 460 to block a gap between the condenser 620*a* and the through portion 376. The sealing member 460 may be made of, for example, a rubber member. An outer circumferential surface of the sealing member 460 may include an insertion groove 462 recessed to insert an edge of the through portion 376.

Figure 11:
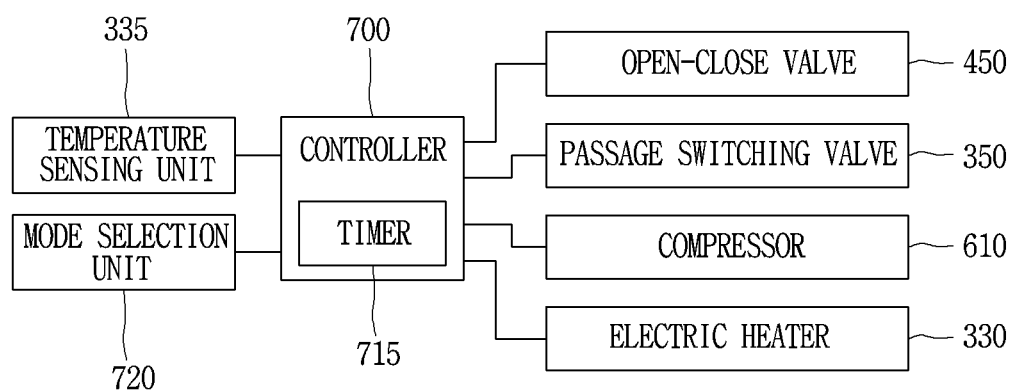
FIG. 11 is a control block diagram of the dishwasher in FIG. 1.

As illustrated in FIGS. 9 and 10, the upper guide 370 may be implemented, for example, in a tubular shape in which a passage for washing water is disposed. The upper guide 370 may have, for example, a rectangular tube shape having a rectangular cross section with a thickness smaller than the width thereof. The upper guide 370 may include, for example, a first guide portion 370*a* and a second guide portion 370*b* that are in contact with each other and hermetically coupled to each other with the condenser 620*a* interposed therebetween. The upper guide 370 may include a condenser support portion 372 for supporting the condenser 620*a* to be spaced apart from a predetermined distance (D) from an inner surface thereof. The condenser support portion 372 may include, for example, a plurality of support pieces 373 spaced apart from one another along a longitudinal direction of the refrigerant pipe of the condenser 620*a*. The support pieces 373 are spaced apart along a width direction of the upper guide 370. As a result, an inlet side refrigerant pipe 621 and an outlet side refrigerant pipe 622 of the condenser 620*a* may be supported. Here, the inlet side refrigerant pipe 621 is connected to the compressor 610, the outlet side refrigerant pipe 622 is connected to the expansion apparatus 630. The support pieces 373 may include contact support surfaces 375, respectively, recessed to correspond to an outer surface of the refrigerant pipe of the condenser 620*a*. The upper guide 370 may be defined by inserting the refrigerant pipe of the condenser 620*a* between the support pieces 373 inside the first guide portion 370*a* and the second guide portion 370*b*, and then fusing and coupling the contact surfaces of the first guide portion 370*a* and the second guide portion 370*b* to each other. Fusion portions 377 may be provided in contact regions, respectively, between the first guide portion 370*a* and the second guide portion 370*b*. FIG. 11 is a control block diagram of the dishwasher in FIG. 1. As illustrated in FIG. 11, a dishwasher according to the present embodiment is configured to include a controller 700 implemented as a microprocessor provided with a control program. A temperature sensing units 335 for sensing the temperature of the washing water is connected to the controller 700 in a communicable manner. The controller 700 is controllably connected to the compressor 610 of the heat pump 600*a* to heat the washing water. The open-close valve 450 is controllably connected to the controller 700 so as to control the supply of the washing water inside the sump 210. The passage switching valve 350 is controllably connected to the controller 700 so as to control the supply of the washing water to the spray arm 180.

In some implementations, the controller 700 is connected to the mode selection unit 720 for selecting an operation mode in a communicable manner. The operation mode may include, for example, a rapid washing mode capable of shortening the heating time of washing water. In some cases, the controller 700 may include the mode selection unit 720. In some cases, the mode selection unit 720 may include an input unit such as a button, a touch pad, a knob, or the like that is configured to receive user input.

When the rapid washing mode is selected by the mode selection unit 720, the controller 700 may be configured to control the heat pump 600*a* and the electric heater 330 such that the washing water is heated by the heat pump 600*a* and the electric heater 330 at the same time. The electric heater 330 is controllably connected to the controller 700.

The operation mode may include, for example, an energy saving washing mode capable of relatively saving energy when the washing water is heated. When the energy saving washing mode is selected by the mode selection unit 720, the controller 700 may be configured to control the heat pump 600a such that the washing water is heated by the operation of the heat pump 600a without operating the electric heater 330.

The operation mode may include a general washing mode for heating the washing water by the heat pump 600a and selectively operating the electric heater 330. More specifically, for example, the controller 700 may additionally operate the electric heater 330 when the outside air temperature is relatively low at the time of selecting the general washing mode, and the operating efficiency of the heat pump 600a is relatively low, thereby properly maintaining the heating time of washing water.

The controller 700 may include a timer 715 for calculating a heating time of the washing water.

By this configuration, the controller 700 controls the open-close valve 450 to open the passage of the connection pipe 440 to supply washing water to the sump 210, When a predetermined amount of washing water is supplied to the sump 210, the controller 700 controls the open-close valve 450 to block the connection pipe 440. The controller 700 controls the circulation pump 310 to pump the washing water of the sump 210, and also controls the passage switching valve 350 to selectively supply washing water to the upper spray arm 182, the top spray arm 186, and the lower spray arm 184.

When the energy saving washing mode is selected by the mode selection unit 720, the controller 700 controls the passage switching valve 350 to supply washing water to the upper guide 370, and then controls the compressor 610 to be driven. When the compressor 610 is driven, the refrigerant compressed by the compressor 610 is moved to the condenser 620a. The refrigerant moved to the condenser 620a is in contact with washing water inside the upper guide 370 while passing through an inside of the upper guide 370 to exchange heat. The refrigerant inside the condenser 620a is heat-dissipated and condensed, and the washing water inside the upper guide 370 is heated to increase the temperature. Refrigerant condensed subsequent to heating washing water while passing through the condenser 620a is depressurized and expanded while passing through the expansion apparatus 630. The refrigerant that has passed through the expansion apparatus 630 is moved to the evaporator 640a, and then absorbs surrounding latent heat to evaporate. At this time, the evaporator 640a is heat-exchanged with the air inside the machine room 125 whose temperature is increased by the heating of the compressor 610, thereby facilitating absorption of latent heat to promote evaporation. In addition, cooling is promoted by the latent heat absorption of the evaporator 640a, and thus the load (heat load) is reduced. As a result, the operating efficiency of the heat pump 600a may be improved.

The washing water the temperature of is increased while passing through the upper guide 370 may be sprayed toward the upper rack 162 through the upper spray arm 182. The washing water sprayed into the upper rack 162 washes dishes accommodated in the upper rack 162, and then is dropped to the bottom of the tub 140. The washing water dropped to the bottom of the tub 140 is collected into the sump 210 through the filter.

When the rapid washing mode is selected by the mode selection unit 720, the controller 700 controls the passage switching valve 350 to supply washing water to the upper guide 370, and then control the heat pump 600a to drive the heat pump 600a as well as control power to be applied to the electric heater 330. As a result, the heating time of the washing water may be significantly shortened.

On the other hand, when the general washing mode is selected by the mode selection unit 720, the controller 700 may control the passage switching valve 350 to supply washing water to the upper guide 370, and then control the heat pump 600a to be driven. The controller 700 may calculate the heating time of the washing water through the timer 715, and sense the temperature of the washing water by the temperature sensing unit 335. The controller 700 may control power to be applied to the electric heater 330 when the temperature of the washing water is less than a preset temperature as a result of sensing by the temperature sensing unit 335. As a result, the washing water heating time may be appropriately shortened (maintained) without greatly increasing power consumption.

Hereinafter, another embodiment of the present disclosure will be described with reference to FIGS. 12 and 16.

Figure 12:
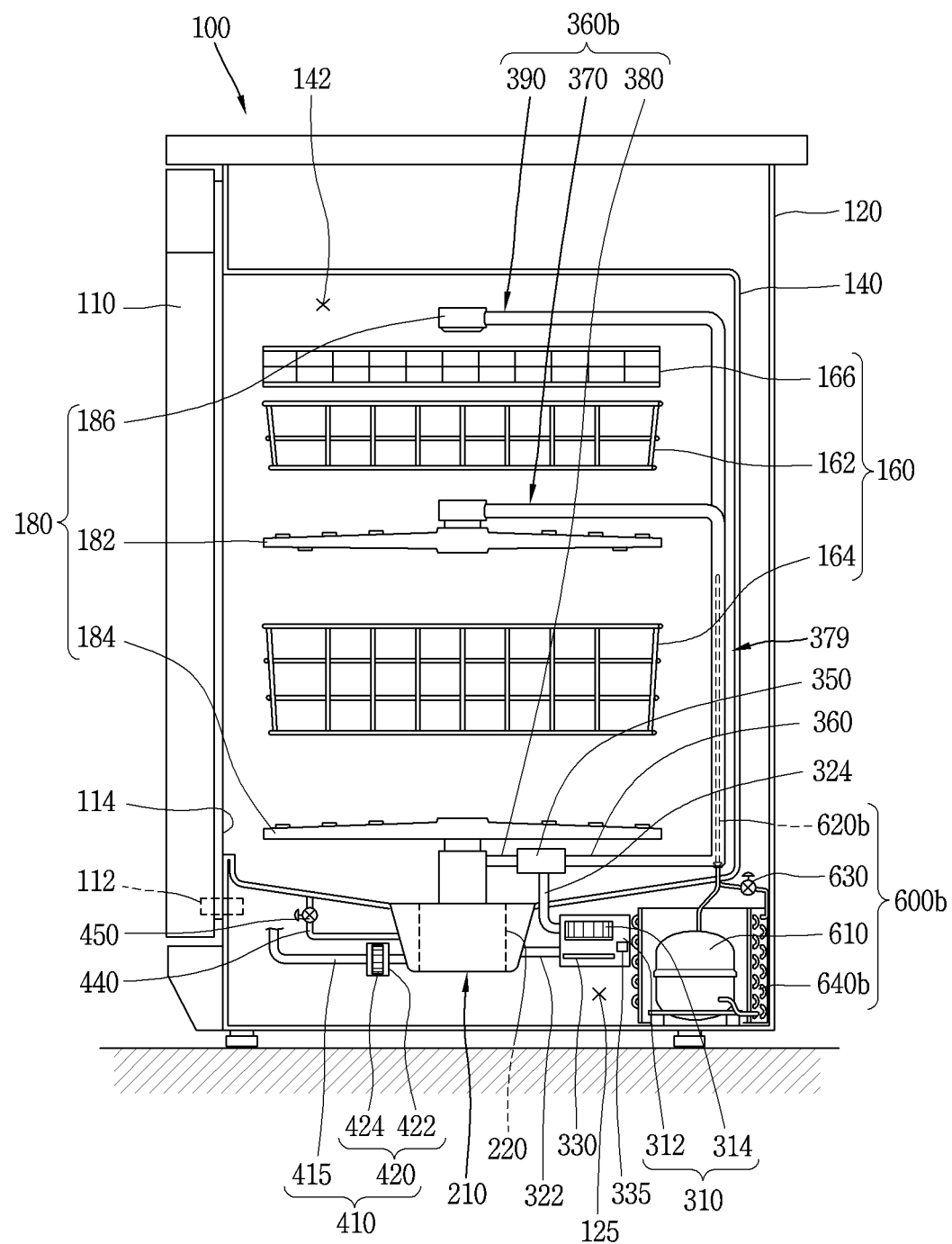
FIG. 12 is a cross-sectional view of a dishwasher having a heat pump according to another embodiment of the present disclosure.
Figure 13:
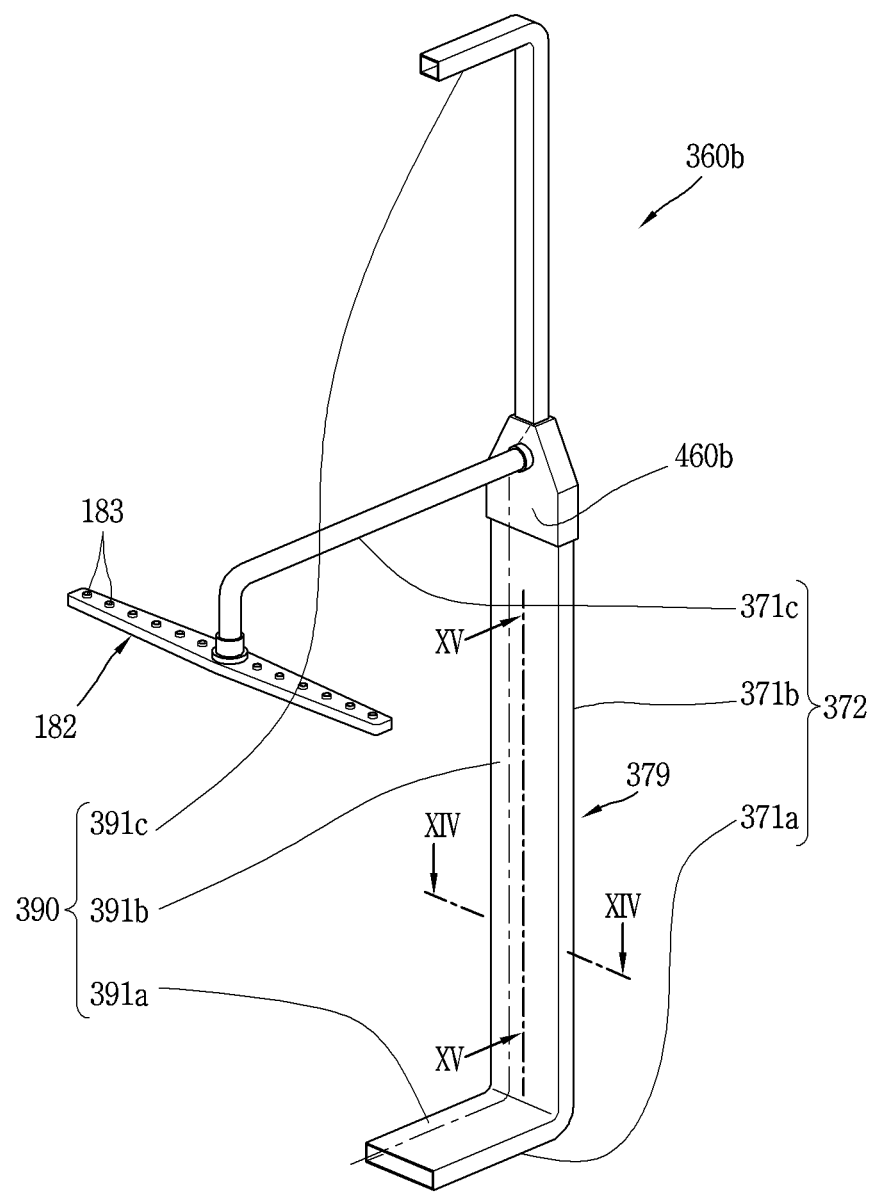
FIG. 13 is a perspective view of the washing water guide in FIG. 12.
Figure 14:
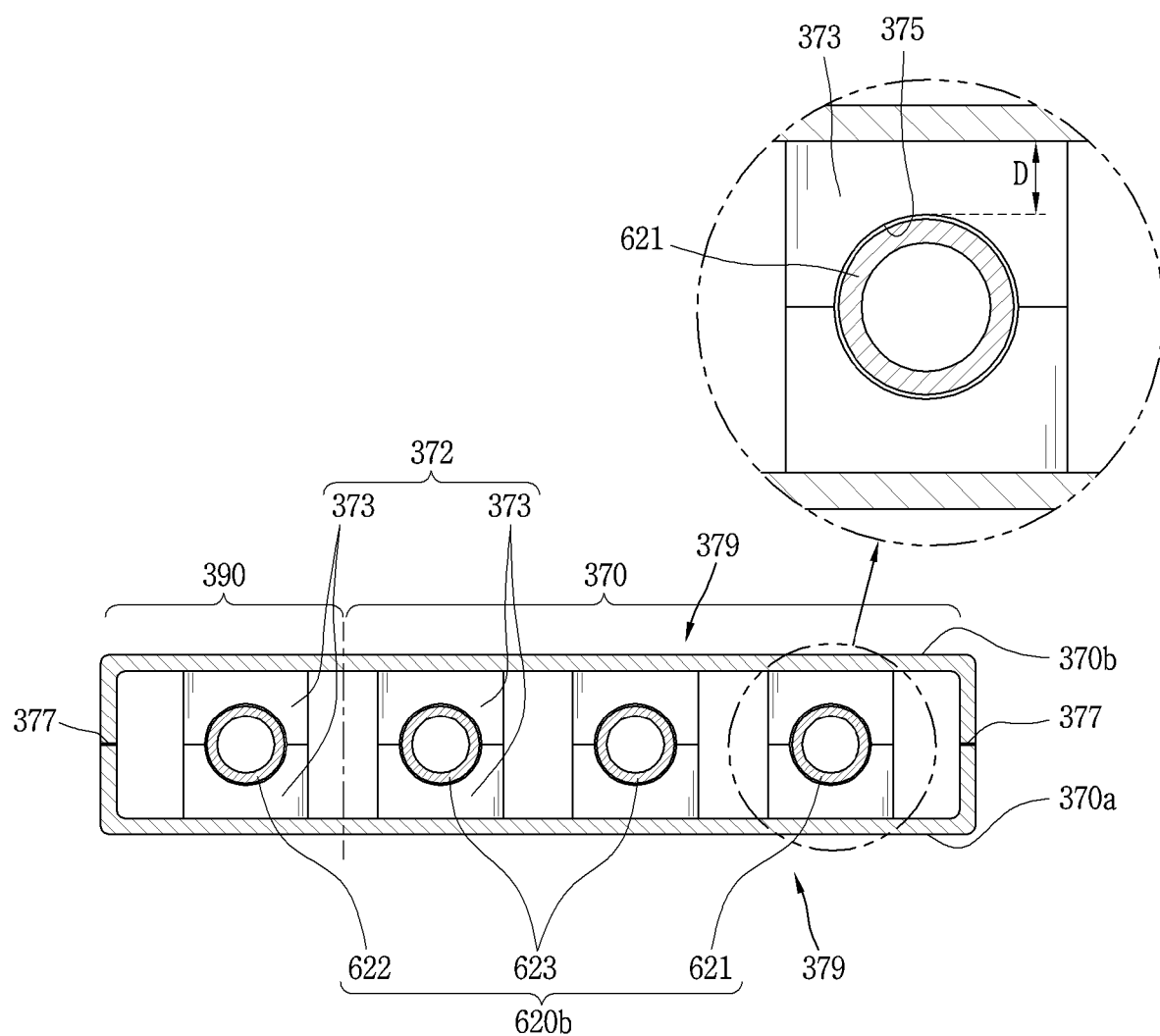
FIG. 14 is a cross-sectional view taken along line XIV-XIV in FIG. 13.
Figure 15:
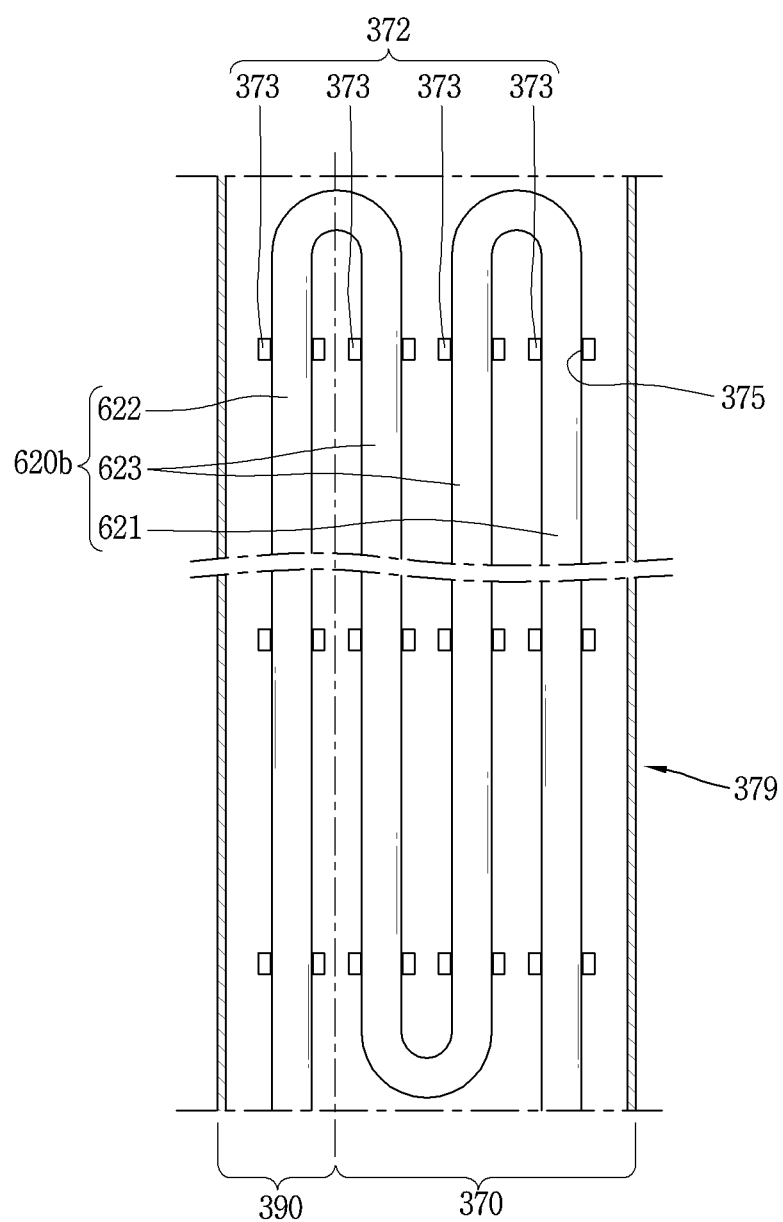
FIG. 15 is a cross-sectional view taken along line XV-XV in FIG. 13.
Figure 16:
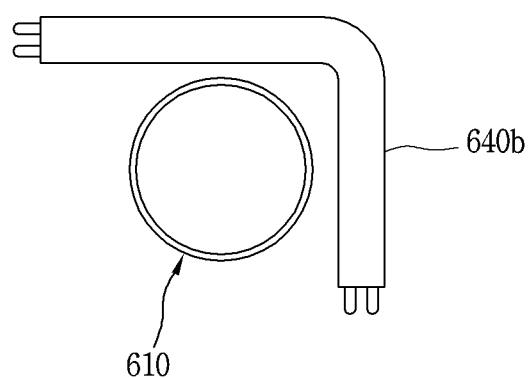
FIG. 16 is a plan view illustrating an arrangement state of a compressor and an evaporator in FIG. 12.

FIG. 12 is a cross-sectional view of a dishwasher having a heat pump according to another embodiment of the present disclosure, and FIG. 13 is a perspective view of the washing water guide in FIG. 12, and FIG. 14 is a cross-sectional view taken along line XIV-XIV in FIG. 13, and FIG. 15 is a cross-sectional view taken along line XV-XV in FIG. 13, and FIG. 16 is a plan view illustrating an arrangement state of a compressor and an evaporator in FIG. 12. As illustrated in FIG. 12, a dishwasher having a heat pump according to the present embodiment includes a dishwasher body 100 having a tub 140 configured with a washing space 142 therein and a sump 210 provided at a bottom of the tub 140 to temporarily accommodate washing water; a spray arm provided inside the washing space 142 to spray washing water; a circulation pump 310 for pumping the washing water of the sump 210; a washing water guide 360b for guiding the washing water pumped by the circulation pump 310 to the spray arm; a heat pump 600b having a compressor 610, an evaporator 640b, an expansion apparatus 630, and a condenser 620b provided in contact with the washing water of the washing water guide 360b to exchange heat; and a controller 700 (see FIG. 7) for controlling the heat pump 600b to increase the temperature of the washing water of the washing water guide 360b.

As described above, a cabinet 120 forming an appearance is provided at an outer side of the tub 140. The rack 160 for accommodating dishes is provided inside the tub 140. The rack 160 includes an upper rack 162, a lower rack 164, and a top rack 166. The spray arm is provided with an upper spray arm 182, a lower spray arm 184, and a top spray arm 186, that are configured to spray washing water toward the upper rack 162, the lower rack 164, and the top rack 166, respectively.

The machine room 125 is disposed under the tub 140 inside the cabinet 120. The heat pump 600b for heating washing water is provided inside the machine room 125. The heat pump 600b includes a compressor 610 for compressing refrigerant, a condenser 620b for condensing refrigerant by heat dissipation, an expansion apparatus 630 for depressurizing and expanding refrigerant, and an evaporator 640b for allowing refrigerant to absorb latent heat to evaporate. The compressor 610, the evaporator 640b, and the expansion apparatus 630 are disposed inside the machine room 125. The condenser 620b is provided inside the washing water guide 360b which will be described later.

One side of the sump 210 is provided with a connection pipe 440 and an open-close valve 450. Another side of the sump 210 is provided with a circulation pump 310. Still another side of the sump 210 is provided with a drain unit 410. A discharge side of the circulation pump 310 is provided with a passage switching valve 350 for switching the passage of washing water to supply washing water to respective spray arms.

On the other hand, the passage switching valve 350 is connected to the washing water guide 360*b* for guiding washing water to the respective spray arms. The washing water guide 360*b* includes a lower guide 380 connected to the lower spray arm 184, an upper guide 370 connected to the upper spray arm 182, and a top guide 390 connected to the top spray arm 186.

As illustrated in FIG. 13, the upper guide 370 and the top guide 390 have a common passage. Here, the common passage denotes that part of the horizontal section and the vertical section of the upper guide 370 and the horizontal section and the vertical section of the top guide 390 are combined with each other. The common passage is configured to have the same flow cross-sectional area as the sum of the flow cross-sectional areas of washing water flowing to the upper spray arm 182 and the top spray arm 186, respectively, when washing water is simultaneously sprayed into the upper spray arm 182 and the top spray arm 186. The common passage has a rectangular cross section having a thickness smaller than the width. A holder 460*b* is provided in an upper region of the common passage of the upper guide 370 and the top guide 390. The holder 460*b* is fixedly coupled to a wall surface of the tub 140 to support the upper guide 370 and the top guide 390. The top guide 390 is protruded in an upwardly extended manner from the upper side of the holder 460*b*. The connection section of the upper guide 370 connected to the upper spray arm 182 is coupled to the holder 460*b*.

As illustrated in FIG. 14 and FIG. 15, the common passage of the upper guide 370 and the top guide 390 includes a condenser 620*b* supporting the condenser 620*b* to be spaced apart by a predetermined distance from an inner surface thereof. The condenser 620*b* includes an inlet side refrigerant pipe 621 through which refrigerant flows in, an outlet side refrigerant pipe 622 through which refrigerant flows out, and a connection pipe 623 connecting the inlet side refrigerant pipe 621 and the outlet side refrigerant pipe 622.

The condenser support portion 372 includes a plurality of support pieces 373 having contact support surfaces 375 recessed to correspond to an outer surface of the refrigerant pipe of the condenser 620*b*. The plurality of support pieces 373 are spaced apart along a length direction of the condenser 620*b*. The plurality of support pieces 373 are spaced apart in a width direction of the common passage of the upper guide 370 and the top guide 390. In the present embodiment, it is illustrated a case in which the plurality of support pieces 373 are arranged in a width direction of the common passage, but it is merely an example, and the number thereof may be appropriately controlled.

Meanwhile, the compressor 610 and the evaporator 640*b* of the heat pump 600*b* are arranged to exchange heat with each other. The evaporator 640*b* is disposed close to a circumference of the compressor 610. As a result, heat exchange between the compressor 610 and the evaporator 640*b* may be promoted. For example, as illustrated in FIG. 16, the evaporator 640*b* may be disposed to surround a lateral surface of the compressor 610 in two directions. The evaporator 640*b* may be bent, for example, in an 'L' shape.

By this configuration, the controller 700 controls the open-close valve 450 to open the passage of the connection pipe 440 to supply washing water to the sump 210, When a predetermined amount of washing water is supplied to the sump 210, the controller 700 controls the open-close valve 450 to block the connection pipe 440. The controller 700 controls the circulation pump 310 to pump the washing water of the sump 210, and also controls the passage switching valve 350 to selectively supply washing water to the upper spray arm 182, the top spray arm 186, and the lower spray arm 184. When the energy saving washing mode is selected by the mode selection unit 720, the controller 700 may control the passage switching valve 350 to supply washing water to a common passage of the upper guide 370 and the top guide 390, and control the heat pump 600*b* to heat the washing water of the common passage. According to this, the use of the electric heater 330 is excluded, and thus power consumption may be significantly reduced to implement an energy saving function.

When the rapid washing mode is selected by the mode selection unit 720, the controller 700 may control the passage switching valve 350 to supply washing water to the common passage of the upper guide 370 and the top guide 390. 350, and control the heat pump 600*b* and the electric heater 330 to operate the heat pump 600*b* and the electric heater 330, respectively. As a result, the heating time of the washing water is remarkably shortened to implement a rapid washing function.

When a general washing mode is selected by the mode selection unit 720, the controller 700 may control the passage switching valve to supply washing water to a common passage of the upper guide 370 and the top guide 390, and control the heat pump 600*b* to be driven. The controller 700 may calculate the washing water heating time by the timer 715, and compare the temperature of the washing water sensed by the temperature sensing unit 335 with a preset temperature, and control the electric heater 330 to be operated to apply power to the electric heater 330 when the sensed washing water temperature is less than the preset temperature. According to this, when the operating efficiency of the heat pump 600*b* is deteriorated, the electric heater 330 may be selectively used to significantly reduce power consumption, and suppress the washing water heating time from being excessively prolonged due to the deterioration of the operating efficiency of the heat pump 600*b*.

On the other hand, refrigerant compressed and discharged by the compressor 610 may be moved to the condenser 620*b* and condensed by exchanging heat with washing water inside the common passage of the upper guide 370 and the top guide 390. The washing water the temperature of which is increased by exchanging heat with the condenser 620*b* may be moved to the upper spray arm 182 and the top spray arm 186, respectively, and sprayed to the upper rack 162 and the top rack 166, respectively. The refrigerant condensed in the condenser 620*b* is depressurized and expanded while passing through the expansion apparatus 630. The refrigerant that has passed through the expansion apparatus 630 is moved to the evaporator 640*b*, and then absorbs surrounding latent heat to evaporate. In this case, the evaporator 640*b* may absorb heat energy released from the compressor 610 to promote the evaporation of refrigerant. In addition, the compressor 610 may reduce heat load by promoting cooling by the latent heat absorption action of the evaporator 640*b* disposed to surround the compressor 610. As a result, the operating efficiency of the heat pump 600*b* may be improved.

As described above, preferred embodiments of the present invention are illustrated and described herein with reference to the accompanying drawings. However, the present disclosure may be implemented in various embodiments without departing from the concept or gist of the invention, and thus the foregoing embodiments should not be limited to the content of the detailed description.

Furthermore, the foregoing embodiments should be broadly construed within the scope of the technical concept defined by the appended claims even though they are not specifically disclosed in the detailed description herein. Moreover, all changes and modifications within the technical scope of the claims and the equivalent scope thereof should be construed to be included in the appended claims.

What is claimed is:

1. A dishwasher comprising:
a dishwasher body comprising a tub that defines a washing space therein and a sump disposed at a bottom of the tub and configured to accommodate washing water;
a spray arm disposed inside the washing space and configured to spray washing water to the washing space, the spray arm comprising an upper spray arm and a lower spray arm that are disposed inside the washing space and spaced apart from each other in a vertical direction;
a circulation pump configured to pump washing water from the sump;
a washing water guide configured to guide washing water pumped by the circulation pump to the spray arm, the washing water guide comprising an upper guide connected to the upper spray arm and a lower guide connected to the lower spray arm;
a heat pump comprising a compressor, an evaporator, an expansion apparatus, and a condenser, the compressor being disposed vertically below a lower surface of the tub, and the condenser being configured to exchange heat with washing water in the washing water guide based on contacting washing water in the washing water guide; and
a controller configured to control the heat pump to thereby increase a temperature of washing water in the washing water guide,
wherein the condenser comprises an inlet side refrigerant pipe and an outlet side refrigerant pipe that are arranged in parallel to each other and disposed inside the upper guide of the washing water guide, and
wherein the outlet side refrigerant pipe is connected to the expansion apparatus, and an end of the inlet side refrigerant pipe passes through the lower surface of the tub and is connected to the compressor.

2. The dishwasher of claim 1, wherein the spray arm further comprises a top spray arm disposed at an upper portion of the washing space,
wherein the washing water guide further comprises a top guide connected to the top spray arm,
wherein the upper guide and the top guide are branched from a common passage configured to guide washing water pumped by the circulation pump, and
wherein the condenser is disposed inside the common passage.

3. The dishwasher of claim 1, further comprising:
a passage switching valve that is disposed between the washing water guide and the circulation pump and that is configured to switch supply of washing water between the upper guide and the lower guide,
wherein the controller is configured to:
control the passage switching valve to supply washing water to the upper guide,
control the circulation pump to be driven based on the passage switching valve being switched to supply washing water to the upper guide, and
based on the circulation pump being driven, drive the heat pump to thereby increase a temperature of washing water in the upper guide.

4. The dishwasher of claim 3, wherein the controller is configured to:
select an operation mode of the dishwasher body; and
control the passage switching valve and the heat pump according to the operation mode.

5. The dishwasher of claim 4, wherein the controller is configured to:
based on the operation mode corresponding to an energy saving washing mode, control the passage switching valve to supply washing water to the upper guide and drive the heat pump.

6. The dishwasher of claim 4, further comprising an electric heater configured to heat washing water in the sump,
wherein the controller is configured to, based on the operation mode corresponding to a rapid washing mode, control the passage switching valve to supply washing water to the upper guide and drive the heat pump and the electric heater.

7. The dishwasher of claim 4, further comprising:
an electric heater configured to heat washing water in the sump based on power applied to the electric heater; and
a temperature sensing unit configured to sense a temperature of washing water in the sump,
wherein the controller is configured to:
based on the operation mode corresponding to a general washing mode, control the passage switching valve to supply washing water to the upper guide, and then drive the heat pump,
sense the temperature of washing water in the sump by the temperature sensing unit based on an elapse of a predetermined time after supplying washing water to the upper guide, and
apply power to the electric heater based on the sensed temperature of washing water in the sump being less than a predetermined temperature.

8. The dishwasher of claim 1, further comprising a condenser support portion that is disposed at an inside of the washing water guide and that supports the condenser.

9. The dishwasher of claim 8, wherein the condenser support portion supports the condenser to be spaced apart from an inner wall surface of the washing water guide by a predetermined distance.

10. The dishwasher of claim 8, wherein the condenser support portion comprises a plurality of support pieces that are spaced apart from one another, each of the plurality of support pieces defining a contact support surface that is recessed to receive a refrigerant pipe of the condenser and that faces an outer surface of the refrigerant pipe of the condenser.

11. The dishwasher of claim 10,
wherein the plurality of support pieces are spaced apart from one another in a length direction of each of the inlet side refrigerant pipe and the outlet side refrigerant pipe.

12. The dishwasher of claim 10, wherein the condenser further comprises:
a connection pipe that connects the inlet side refrigerant pipe to the outlet side refrigerant pipe, and
wherein the plurality of support pieces are spaced apart in a length direction of each of the inlet side refrigerant pipe, the outlet side refrigerant pipe, and the connection pipe.

13. The dishwasher of claim 8, wherein the washing water guide comprises a first guide portion and a second guide portion that are coupled to each other and that contact each other, and wherein the condenser is interposed between the first guide portion and the second guide portion.

14. The dishwasher of claim 1, wherein the compressor and the evaporator are configured to exchange heat with each other.

15. The dishwasher of claim 14, wherein the evaporator is curved and extends in at least two directions, and surrounds at least a portion of a lateral surface of the compressor.

16. The dishwasher of claim 1, further comprising a water tank disposed vertically below the bottom of the tub and configured to receive water, wherein the evaporator is disposed inside the water tank and configured to exchange heat with water in the water tank.

17. The dishwasher of claim 16, further comprising:

a water pipe configured to supply water to the water tank;
a water level sensing unit configured to sense a water level inside the water tank; and
a water pipe valve that is configured to open or close the water pipe based on a sensing result of the water level sensing unit.

18. The dishwasher of claim 17, wherein the water tank is disposed at an upper side of the compressor.

19. The dishwasher of claim 18, further comprising:

a heat transfer member that is disposed between the water tank and the compressor and that is configured to exchange heat with the compressor and transfer heat energy of the compressor to the water tank, wherein the heat transfer member has:

a first end coupled to the water tank at a first height relative to a bottom of the water tank, and
a second end coupled to the water tank at a second height relative to the bottom of the water tank that is different from the first height.

20. The dishwasher of claim 1, further comprising a condenser support portion that is disposed inside the upper guide of the washing water guide, the condenser support portion defining a recess that surrounds and supports an outer surface of each of the inlet side refrigerant pipe and the outlet side refrigerant pipe.

* * * * *